Nov. 11, 1969
P. DUBACH
3,477,287
APPARATUS FOR TESTING BURST RESISTANCE
AND DOME ELASTICITY OF SHEET MATERIAL
Filed Feb. 27, 1967
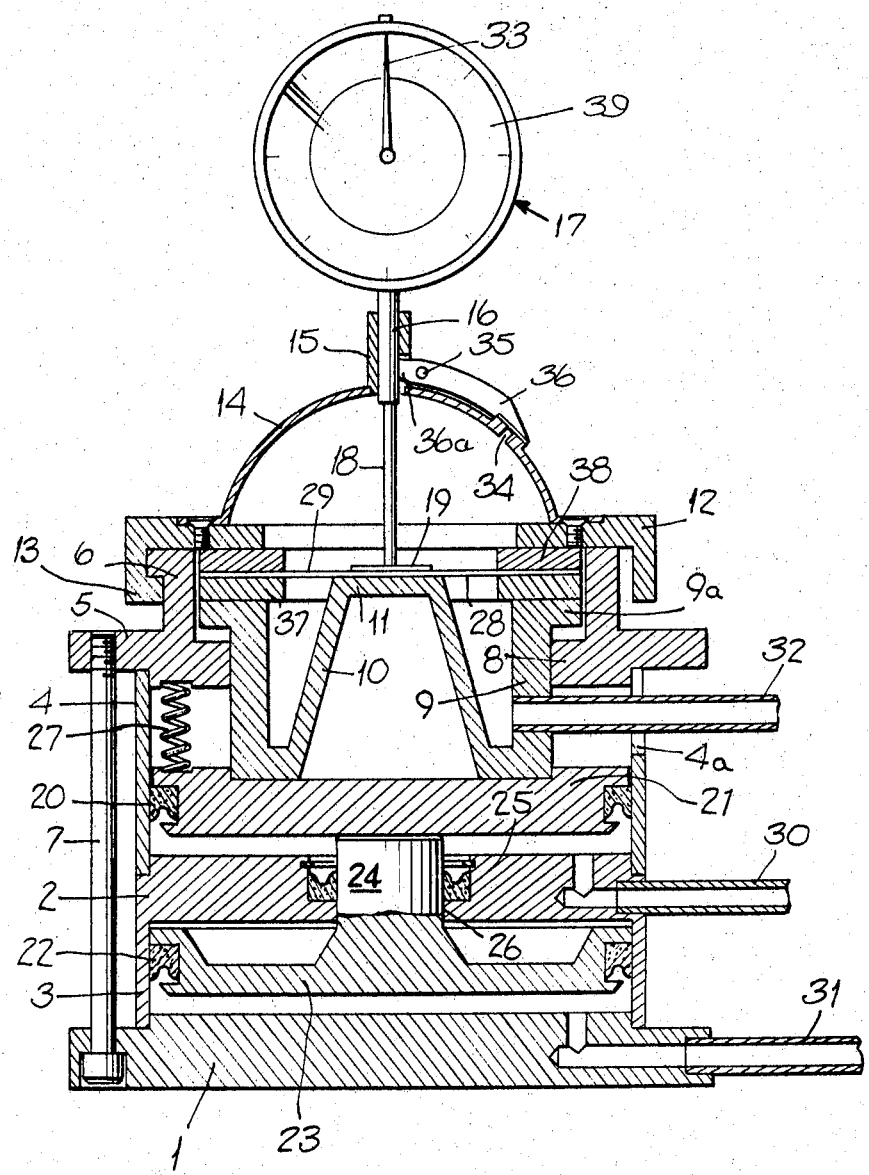
INVENTOR.
PAUL DUBACH
BY
ATTORNEYS United States Patent Office 3,477,287
Patented Nov. 11, 1969

3,477,287
APPARATUS FOR TESTING BURST RESISTANCE AND DOME ELASTICITY OF SHEET MATERIAL
Paul Dubach, Wattwil, Switzerland, assignor to Heberlein & Co. AG., Wattwil, Switzerland, a corporation of Switzerland
Filed Feb. 27, 1967, Ser. No. 618,797
Claims priority, application Switzerland, Mar. 17, 1966, 3,860/66
Int. Cl. G01n *3/26*
U.S. Cl. 73—102                        2 Claims

ABSTRACT OF THE DISCLOSURE

Apparatus for testing burst resistance and dome elasticity of flexible sheet material including a holding fixture, means associated with the fixture for supporting material to be tested, a tension clamp, a piston drive system for urging the fixture and clamp together to clamp the material to be tested, and means admitting fluid under pressure to one side of the material.

---

This invention relates to testing apparatus, and more particularly, to apparatus for testing the burst resistance and dome or vaulting elasticity or flexible sheet material such as textile fabrics, paper, pressboard, plastic and synthetic sheets and the like.

In apparatus of the class described, an example of the material to be tested is fixed in a frame and loaded as by a fluid under pressure until it bursts. The burst resistance is determined from the pressure of the fluid and the area of material subjected to the pressurized fluid. Under the effect of the fluid load, the material is forced to assume a domed or vaulted configuration and its elevation is a measure of the elasticity of the material.

Heretofore devices were known for testing the burst resistance and dome elasticity wherein the material was pressed against a tensioning plate by means of a tensioning cup fixed at its lower end by a screw. A hand driven worm drive arrangement was used to press the cup against the material. To determine burst resistance and dome elasticity, compression was supplied and burst pressure was determined by a manometer, and the dome elasticity by a rule or the like. This apparatus was unsatisfactory however, because during tensioning and securing of the sample, it was often deformed due to rotation of the cup so that setting up had to be repeated, sometimes several times before a reliable test could be run.

Accordingly, I have conceived by my invention apparatus of the class described that overcomes the foregoing difficulties and disadvantages and provides a rapidly and reliably functioning testing apparatus.

In essence, my invention comprises an apparatus of the class described for testing burst resistance and dome elasticity of flexible sheet material, a holding fixture, material supporting means associated with the fixture, a tension clamp positioned above the fixture, a piston drive system adapted to urge the fixture and clamp together to clamp the material being tested tightly therebetween, and means admitting fluid under pressure to one side of the material.

Actually, the piston drive system may comprise cylinder means, a plurality of pistons in tandem disposition in the cylinder means, means delivering fluid to drive the pistons to urge the fixture and clamp together, and means transmitting the total force of the pistons to effect the clamping action.

As a feature of my invention, the pistons are separated in the cylinder means by a stationary partition, and the transmitting means may comprise a projection on one piston extending through the partition and contacting the next adjacent downstream piston in the clamping direcion. In this way a very high pressure is obtained for clamping the material since the force generated by applying pressure to the combined piston surfaces is concentrated on the clamping means. Additionally, a reduction of magnitude is possible as regards the fluid pressure necessary for reliable junction. Springs may be used to urge the next adjacent downstream piston towards the projection so that adjacent pistons are maintained to a constant spacing.

I also prefer to employ spacing rings between the tension clamp and fixture to clamp the material therebetween.

As mentioned, material support means are associated with the holding fixture. Such means may comprise a portion of the fixture itself arranged to provide a supporting surface beneath a central zone of the material, to be tested so that the material is perfectly flat when set up for the test, and yet no interference is had when fluid under pressure is applied to the under surface of the material.

A further economy of fluid is achieved by forming the holding fixture with an upstanding configuration in the form of a truncated cone; and the upper surface of the cone can serve as the central support surface for the material.

In accordance with the present concept, means are provided on the side of the material opposite the pressure loaded side which sense and indicate the elasticity. Such means may comprise a dome sealing the outer surface of the material from the atmosphere, a plunger in the dome moveable with the material under load, valve means venting the dome upon bursting of the material and means associated with the valve recording the extent of movement of the material upon venting of the dome.

There has thus been outlined rather broadly the more important feature of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification wherein:

The single figure is a vertical cross-sectional view of apparatus according to my present concept.

Referring to the drawing in detail, there is shown a base plate 1 supporting an intermediate plate or partition 2 by means of a depending cylindrical section 3 integral with the partition 2, and an upstanding cylindrical section 4 integral with the partition 2 and concentric with the section 3. An annular member 6 is positioned atop the cylindrical section 4 and is formed with an outwardly extending flange 5 which is utilized to clamp the annular member 6 to the base plate 1 by means of bolts 7.

The annular member 6 also has an inwardly extending flange 8 which supports the undersurface of a cooperating annular flange or rim 9a of a cylindrical holding fixture 9 formed with a central, upstanding truncated cone configuration 10 with an elongated section 11 for a purpose to be later described.

An annular tension clamp 12 is positioned atop the annular member 6 and has several cams 13 that engage the member 6 in a bayonet grip. The tension clamp 12 also has a domed hemispherical hood 14 equipped with a central hub 15 supporting a bearing 16 in which a bar 18 of the measuring device 17 is positioned for vertical, longitudinal movement. The bar 18 has a flat plate 19 affixed to its lower end and normally positioned just over the upper surface of the section 11 of fixture 9.

A pair of removeable and similar clamping rings 37 and 38 are positioned atop the flange 9a of the fixture 9 and engage the lower surface of the tension clamp 12 which, it will be recalled, is held in position by the bolts 7 acting through annular member 6 to which clamp 12 is secured by means of bayonet joints. The area defined by the clamping rings 37 and 38 corresponds to that of the sample to be tested.

A piston 21 is disposed for vertical movement in the cylindrical section 4, and this piston is connected to the lower face of the fixture 9. Annular packing 20 seals the piston and cylindrical section. A second piston 23 is disposed for vertical movement in the lower cylindrical section 3 and, again, packing 22 seals the piston and section. A central cylindrical projection 24 of piston 23 extends upwardly through a bore 26 in the partition 2 and is sealed by packing 25; and spring 27 (only one is shown) press the piston 21 against the top of the projection 24.

In operation, a sample of the material 29 to be tested is placed upon a thin rubber diaphragm 28 having a flap valve (not shown) at its center, and both are inserted between the rings 37 and 38 which are placed upon the flange 9a of the fixture 9. This assembly is then locked together by placing the tension clamp 12 over the upper ring 38 and securing it to the member 6 by means of the bayonet joints. Compressed air is then introduced into the spaces beneath the pistons 21 and 23 by means of conduits 30 and 31 connected to convenient bores in the base plate 1 and the partition 2, respectively.

It will be seen that the pressure is applied beneath the pistons 21 and 23, the force exerted on piston 23 being transferred to pistons 21 by means of the projection 24, to raise the fixture 9 and effect positive firm clamping of the diaphragm 28 and the material 29 to be tested.

To test for burst resistance and dome elasticity, compressed air is introduced into the interior of fixture 9 by means of conduit 32, section 4 being slotted at 4a to allow for vertical movement of this conduit. If, as the pressure increases, the diaphragm 28 and material 29 begin to assume a domed configuration, the plate 19, which is in contact with the surface of the material, will move upwardly, such movement being transferred to a measuring service 17 through bar 18. The arm 33 of device 17 will record this movement on face 39 which may be calibrated as desired.

When the material 29 bursts, the flap valve of diaphragm 28 opens to allow compressed air to enter the space encompassed under the hood 14. This air escapes through air opening 34 to raise an end of arm 36 pivotally mounted at 35 for the purpose. Upon such movement of the arm 36, one end 36a thereof engages a slot (not shown) in the shaft 16 of the device 17 and holds the bar 18 in raised position so that the elevation of the material may be subsequently read from the device 17.

From the foregoing description, it will be seen that the present invention contributes pneumatic tightening apparatus that assures a strong grip on the material 29 without the disadvantages attendant on prior devices of the class described. Additionally, no wrinkling or tearing occurs in material with a high burst resistance such as fibers made of synthetic material. It will also be seen that utilization of the several pistons makes it possible to obtain a high pressure on the fixture 9 even when using compressed air from readily available, relatively low pressure sources. The truncated cone configurations in the fixture 9 also allows a saving in the volume of compressed air employed for the test.

The construction and operation of the present novel testing apparatus will now be understood, and the advantages thereof will be fully appreciated by those persons skilled in the art.

I claim:

1. In apparatus of the class described for testing burst resistance and dome elasticity of flexible sheet material, a holding fixture, material support means associated with said fixture, a tension clamp positioned above said fixture, a piston drive system adapted to urge said fixture and clamp together to clamp the material being tested tightly therebetween, means admitting fluid under pressure to one side of the material, and means on the other side of the material sensing and indicating the elasticity of such material, said last-mentioned means comprising a dome sealing the outer surface of the material from atmosphere, a plunger in said dome moveable with the material under load, valve means venting said dome upon bursting of the material and means associated with said valve means recording the extent of movement of the material upon venting of said dome.

2. In apparatus of the class described for testing burst resistance and dome elasticity of flexible sheet material, a holding fixture, a truncated cone configuration within said fixture, the upper surface of said cone configuration providing a support beneath the central zone of the material to be tested, a tension clamp positioned above said fixture, a pair of clamp rings removably positioned between said clamp and fixture to clamp the material to be tested therebetween, a piston drive system adapted to urge said fixture and clamp together to clamp the material being tested tightly therebetween, and means admitting fluid under pressure to one side of the material.

References Cited

UNITED STATES PATENTS

| | | | |
|---|---|---|---|
| 1,926,076 | 9/1933 | Whalen | 92—62 X |
| 2,332,818 | 10/1943 | Smith | 73—102 |
| 3,050,991 | 8/1962 | Madrzyk et al. | 73—102 X |
| 3,288,036 | 9/1963 | Fisher | 92—62 |

FOREIGN PATENTS

| | | |
|---|---|---|
| 1,111,424 | 7/1961 | Germany. |

OTHER REFERENCES

Foxboro Bulletin 10–5 pp. 1, 9 and 12, published August 1964.

RICHARD C. QUEISSER, Primary Examiner

C. E. PHILLIPS, Assistant Examiner